UNITED STATES PATENT OFFICE.

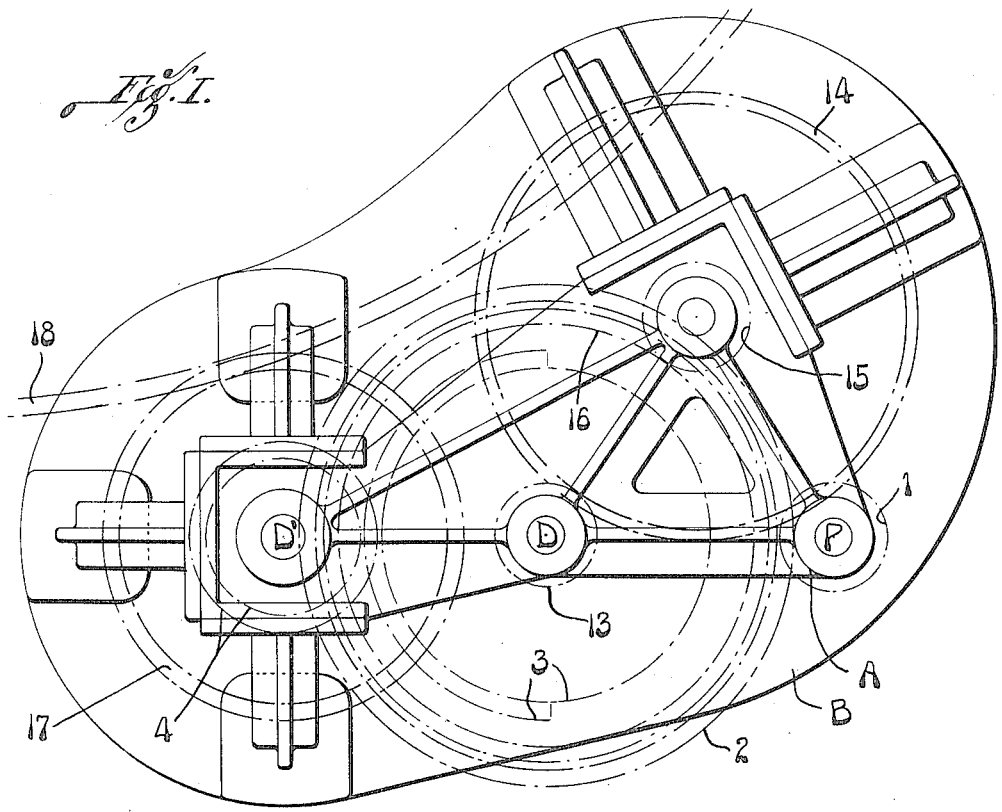
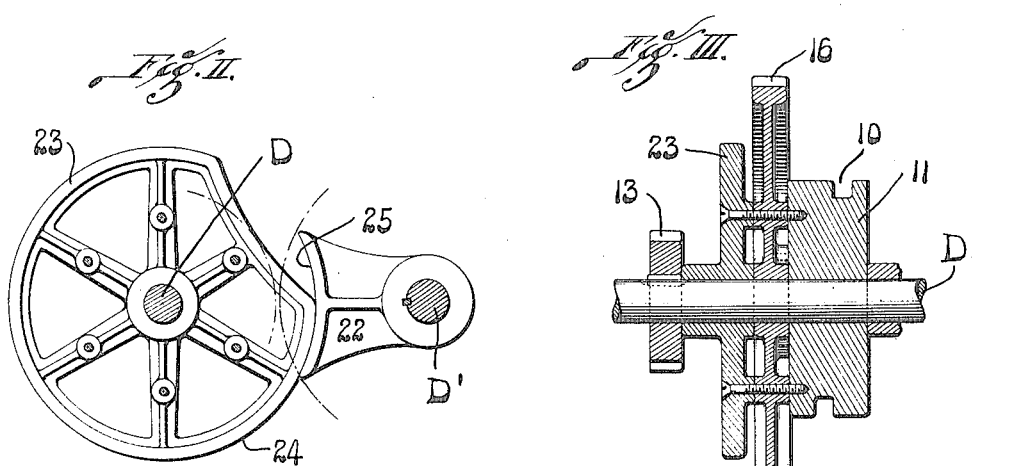

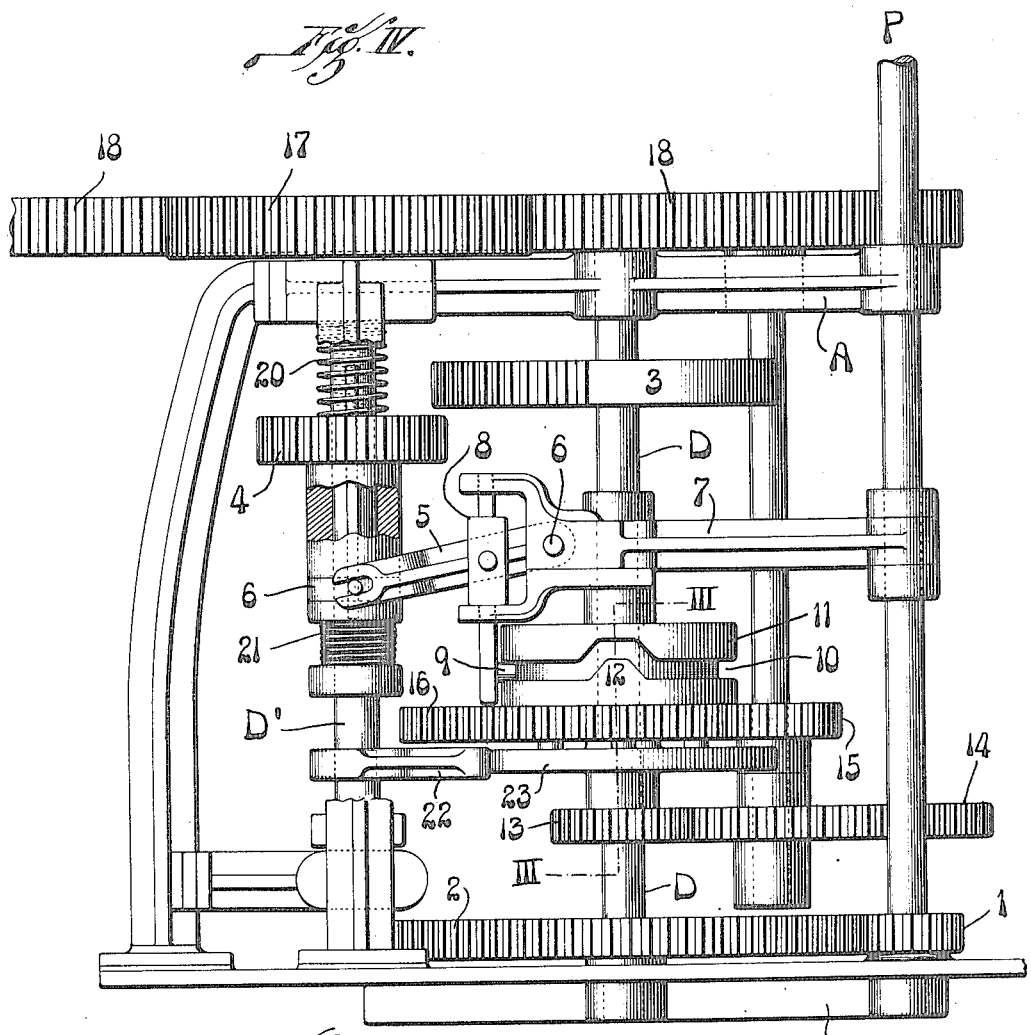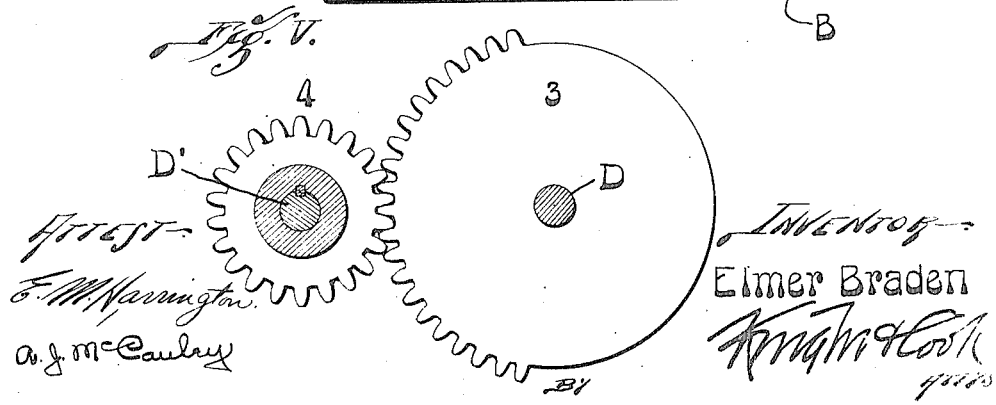

ELMER BRADEN, OF QUINCY, ILLINOIS, ASSIGNOR TO WILLIAM J. RUFF, OF QUINCY, ILLINOIS.

POWER-TRANSMISSION DEVICE.

1,196,328.  Specification of Letters Patent.  Patented Aug. 29, 1916.

Application filed July 27, 1914. Serial No. 853,474.

*To all whom it may concern:*

Be it known that I, ELMER BRADEN, a citizen of the United States of America, a resident of Quincy, in the county of Adams and State of Illinois, have invented certain new and useful Improvements in Power-Transmission Devices, of which the following is a full, clear, and exact description, reference being had to the accompanying drawings, forming a part of this specification.

My invention relates to a power transmission device, one of the objects being to produce a very efficient means for intermittently transmitting the movement of a drive shaft to a driven shaft.

Another object is to provide means for automatically stopping the drive shaft at a predetermined point when the power transmission member is released from the driving member.

The invention also includes certain details of construction which will be hereinafter described.

Figure I is a top or plan view of my power transmission device, the gearing being shown diagrammatically. Fig. II is a detail view, illustrating the means for stopping the driven shaft. Fig. III is a section taken approximately on the line III—III, Fig. IV. Fig. IV is a side elevation, partly in section, of the parts shown in Fig. I. Fig. V is a horizontal section illustrating the segmental drive wheel and the transmisison wheel.

The preferred form of my invention, as shown in the accompanying drawings, comprises a constantly rotating power shaft P, a constantly rotating drive shaft D geared to the power shaft, and a driven shaft D' adapted to rotate intermittently in response to the movement of the drive shaft D. All of these shafts are rotatably fitted to upper and lower bearing frames A and B. The drive shaft D is rotated continuously through the medium of a pinion 1 fixed to the lower end of the power shaft P and a gear wheel 2 meshing with said pinion, the gear wheel 2 being secured to the lower end of the drive shaft D. A drive member 3 secured to the upper portion of the drive shaft, is preferably a segmental gear wheel adapted to mesh with a transmission wheel 4 splined to the driven shaft D'. The drive wheel 3 rotates continuously and the transmission wheel 4 is shifted into engagement with said drive wheel at regular intervals to impart an intermittent movement to the driven shaft D'.

The means for shifting the transmission wheel 4 comprises a shifter lever 5 straddling the hub of the transmission wheel and fitted to a collar 6 loosely secured to said hub. The shifter lever 5 is pivoted at 6 to an arm 7 supported between collars on the shafts P and D. A vertically movable shifter member 8, slidably fitted to the arm 7, is provided with a cam roller or pin 9 which extends into a groove 10 formed in the cam 11. The cam 11 is provided with a shoulder 12 adapted to pass under the cam roller 9 so as to rock the shifter lever 5 thereby shifting the transmission wheel 4 into the path of the rotating drive wheel 3. The cam 11 is loosely supported on the drive shaft D, and it is driven at a comparatively low rate of speed by means of a train of gearing consisting of a pinion 13 secured to the drive shaft D, a gear wheel 14 meshing with said pinion, and a second pinion 15 secured to the gear wheel 14 and meshing with a gear 16, the latter being fixed to the cam 11.

A gear wheel 17 secured to the upper end of the driven shaft D' meshes with a very large gear wheel, or gear ring 18, the object being to drive the large gear 18 a predetermined distance at regular intervals. The large gear wheel 18 is adapted to be secured to a rotatable pasteurizer tank and this gear wheel 18 is driven intermittently through the medium of the transmission wheel 4 and driven shaft D'. The device I have shown in illustrating the invention is particularly adapted to drive large pasteurizer tanks predetermined distances at regular intervals, permitting the tanks to remain at rest for the purpose of loading and unloading the pasteurizing compartments. For example, the parts may be so timed that the transmission wheel 4 will make one revolution in one minute, while the cam 11 will make one complete revolution in twenty minutes, and in this event the transmission wheel 4 will remain idle 19 minutes at which time the cam shoulder 12 passing under the cam roller 9, will lift the transmission wheel into the path of the segmental drive wheel 3. The drive wheel 3 will then turn the transmission wheel one complete revolution in one minute, and when the blank face of the drive wheel 3 faces the teeth of the transmission wheel 4 the latter will be moved downwardly by the cam 11.

The springs 20 and 21 surrounding the driven shaft D' and located above and below the transmission wheel 4 are for the purpose of imparting an initial impulse to the wheel 4 when it is shifted to or from the drive wheel 3. When the wheels 3 and 4 are engaged with each other the spring 20 tends to disengage them, and when the wheels are disengaged as shown in Fig. IV the spring 21 tends to move the transmission wheel into engagement with the drive wheel. The object is to positively release the transmission wheel when it is to be shifted in either direction.

The means for locking the driven shaft D', when the transmission wheel 4 is shifted from the drive wheel, comprises a rotatable stop arm 22 fixed to the driven shaft D', and a segmental stop member 23 loosely mounted on the drive shaft D and fixed to the cam 11. The segmental stop member 23 is provided with an arcuate abutment face 24 concentric with the axis of the drive shaft, and the stop arm 22 is provided with a concave abutment face 25 corresponding to said arcuate face. The segmental stop member 23 secured to the cam 11 travels at a much lower rate of speed than the drive shaft D, and when the cam is positioned to engage the transmission wheel 4 with the drive wheel 3, the segmental stop member 23 is positioned where it will release the stop arm 22. The driven shaft D' is thus unlocked and permitted to make one complete revolution in response to the movement of the drive shaft. Upon the completion of this movement the stop arm 22, carried by the driven shaft, is again positioned where its concave abutment face 25 will engage the segmental stop member 23. The transmission wheel 4 may be lifted by the cam and shifter lever before the teeth on the segmental drive gear 3 reach the plane of the transmission wheel, and the latter may be moved downwardly after the teeth of the segmental drive gear leave the transmission wheel. No accuracy is required in timing the operation of the cam 11 and shifter lever 5 since the transmission wheel may be shifted while the blank face of the segmental drive gear is facing the drive shaft D'. The locking elements 22 and 23 positively lock the transmission wheel against rotation at a predetermined point, regardless of the movement of the cam and shifter lever 5, the object being to insure the proper matching relation between the transmission wheel and the segmental row of teeth on the drive wheel 3.

I claim:—

1. A power transmission device comprising a drive shaft provided with a drive gear, a driven shaft, a transmission wheel adapted to occupy an operative position where it will mesh with and transmit the movement of said drive gear to said driven shaft, and a shifter for shifting said transmission wheel into and out of the path of said drive gear so as to intermittently transmit the movement of said drive gear to said drive shaft, said shifter being operable in response to movements of said drive shaft.

2. A power transmission device comprising a drive shaft, a driven shaft, a transmission member adapted to occupy an operative position where it will transmit the movement of said drive shaft to said driven shaft, a pivotally supported shifter arm for shifting said transmission member to intermittently transmit the movement of said drive shaft to said driven shaft, and a cam operable by said drive shaft adapted to oscillate said shifter arm at regular intervals.

3. A power transmission device comprising a drive shaft, a segmental drive gear secured to said drive shaft, a driven shaft, a transmission wheel splined to said driven shaft adapted to be moved into and out of the path of said segmental drive gear, and a shifter for shifting said transmission wheel to intermittently transmit the movement of said drive shaft to said driven shaft, said shifter being operable in response to the movements of said drive shaft.

4. A power transmission device comprising a drive shaft, a driven shaft, a transmission wheel adapted to occupy an operative position where it will transmit the movement of said drive shaft to said driven shaft, a shifter for shifting said transmission wheel to intermittently transmit the movement of said drive shaft to said driven shaft, and a cam operable by said drive shaft adapted to move said shifter at regular intervals, said shifter being secured to said cam and transmission wheel so as to positively shift said transmission wheel to and from its operative position.

5. A power transmission device comprising a power shaft, a drive shaft geared to said power shaft, a cam geared to and supported by said drive shaft, said cam being driven at a lower rate of speed than said drive shaft, a drive gear secured to said drive shaft, a driven shaft, a transmission wheel splined to said driven shaft, and a shifter arm for moving said transmission wheel into and out of engagement with said drive gear, the said cam being provided with means for operating said shifter arm at regular intervals.

6. A power transmission device comprising a drive shaft, a driven shaft, a transmission member for transmitting the movement of said drive shaft to said driven shaft, a shifter for moving said transmission member to intermittently transmit the movement of said drive shaft to said driven shaft, a rotatable device for operating said shifter, and power mechanism for rotating said rotatable device at a lower rate of speed than said drive shaft, whereby the drive shaft is turned a number of revolutions while the transmission member occupies its inoperative position.

7. A power transmission device comprising a drive shaft, a driven shaft, a transmission member for transmitting the movement of said drive shaft to said driven shaft, a shifter for moving said transmission member to intermittently transmit the movement of said drive shaft to said driven shaft, a cam for operating said shifter at regular intervals, and power mechanism for rotating said cam at a lower rate of speed than said drive shaft, whereby the drive shaft is turned a number of revolutions while the transmission member occupies its inoperative position.

8. A power transmission device comprising a drive shaft, a driven shaft, a transmission member for transmitting the movement of said drive shaft to said driven shaft, a shifter for moving said transmission member to intermittently transmit the movement of said drive shaft to said driven shaft, a cam for operating said shifter at regular intervals, power mechanism for rotating said cam at a lower rate of speed than said drive shaft, whereby the drive shaft is turned a number of revolutions while the transmission member occupies its inoperative position, and rotatable stop members for automatically stopping said driven shaft when the transmission member is shifted from its operative position, one of said stop members being secured to said cam so as to rotate therewith and the other stop member being carried by said driven shaft.

9. A power transmission device comprising a drive shaft, a driven shaft, a transmission member adapted to occupy an operative position where it will transmit the movement of said drive shaft to said driven shaft, a shifter for shifting said transmission member to intermittently transmit the movement of said drive shaft to said driven shaft, a rotatable stop member operable by said drive shaft, and a rotatable stop member secured to said driven shaft, said stop members being adapted to engage each other to stop the driven shaft when the transmission device is shifted from its operative position.

10. A power transmission device comprising a drive shaft, a driven shaft, a transmission member adapted to occupy an operative position where it will transmit the movement of said drive shaft to said driven shaft, a shifter for shifting said transmission member to intermittently transmit the movement of said drive shaft to said driven shaft, and rotatable stop members fitted to said drive shaft and driven shaft adapted to engage each other to stop the driven shaft when the transmission device is shifted from its operative position, one of said rotatable stop members having an arcuate abutment face concentric with its axis and the other rotatable stop member being provided with a concave abutment face corresponding to said arcuate face.

11. A power transmission device comprising a drive shaft, a driven shaft, a transmission member adapted to occupy an operative position where it will transmit the movement of said drive shaft to said driven shaft, a shifter for shifting said transmission member to intermittently transmit the movement of said drive shaft to said driven shaft, a rotatable stop arm carried by said driven shaft, and a segmental stop member operable by said drive shaft, said rotatable stop arm being provided with a concave abutment face adapted to engage said segmental stop member when the said transmission device is shifted from its operative position.

12. A transmission device comprising a shaft provided with a gear wheel, a transmission wheel movable into and out of engagement with said gear wheel, a spring tending to shift said transmission wheel into engagement with said gear wheel when said wheels are disengaged from each other, and a second spring tending to shift said transmission wheel away from said gear wheel when said wheels are engaged with each other.

ELMER BRADEN.

In the presence of—
FRANK A. LUBLU,
J. M. WINTERS.